United States Patent
Son et al.

(10) Patent No.: US 9,319,126 B2
(45) Date of Patent: Apr. 19, 2016

(54) WIRELESS RELAY DEVICE AND METHOD OF PROCESSING DATA USING THE SAME

(71) Applicant: ELECTRONICS AND TELECOMMUNICATIONS RESEARCH INSTITUTE, Daejeon (KR)

(72) Inventors: Young Ho Son, Daejeon (KR); Jeong-Seok Lim, Daejeon (KR); Jung-Gil Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 10 days.

(21) Appl. No.: 14/306,472

(22) Filed: Jun. 17, 2014

(65) Prior Publication Data

US 2015/0050878 A1 Feb. 19, 2015

(30) Foreign Application Priority Data

Aug. 19, 2013 (KR) ........................ 10-2013-0097788

(51) Int. Cl.
*H04B 3/36* (2006.01)
*H04B 7/155* (2006.01)
*H04M 1/68* (2006.01)

(52) U.S. Cl.
CPC ........ *H04B 7/15507* (2013.01); *H04B 7/15542* (2013.01); *H04M 1/68* (2013.01)

(58) Field of Classification Search
None
See application file for complete search history.

(56) References Cited

U.S. PATENT DOCUMENTS

| | | | | |
|---|---|---|---|---|
| 2006/0227724 A1* | 10/2006 | Thubert | ............... | H04L 45/48 370/254 |
| 2013/0078908 A1* | 3/2013 | Smith | .................. | H04B 7/155 455/11.1 |

FOREIGN PATENT DOCUMENTS

| | | | | |
|---|---|---|---|---|
| JP | WO 2013069461 A1 * | 5/2013 | ......... | H04L 63/0428 |
| KR | 10-2008-0064384 A | 7/2008 | | |
| KR | 10-0949157 B1 | 3/2010 | | |
| KR | 10-0994161 B1 | 11/2010 | | |
| KR | 10-2011-0121675 A | 11/2011 | | |
| KR | 10-1178545 B1 | 8/2012 | | |
| KR | 10-2013-0043009 A | 4/2013 | | |

* cited by examiner

*Primary Examiner* — Edward Urban
*Assistant Examiner* — Mohammed Rachedine
(74) *Attorney, Agent, or Firm* — LRK Patent Law Firm

(57) ABSTRACT

A wireless relay device and a method of processing data using the same are provided. The wireless relay device includes a voice input/output (I/O) unit, a voice processing unit, an information protection processing unit, a Wi-Fi unit, and a radio transmission and reception unit. The voice I/O unit receives or outputs a user voice signal. The voice processing unit performs voice processing on the user voice signal. The information protection processing unit encrypts or decrypts voice data using an information protection algorithm. The Wi-Fi unit sends the encrypted voice data to a portable device of a user located within a set range, or receives encrypted voice data from a portable device of a user located within the set range. The radio transmission and reception unit relays wireless communication to a portable device of a user located outside the set range.

10 Claims, 6 Drawing Sheets

WIRELESS RELAY DEVICE AND METHOD OF PROCESSING DATA USING THE SAME

CROSS REFERENCE TO RELATED APPLICATION

This application claims the benefit of Korean Patent Application No. 10-2013-0097788, filed on Aug. 19, 2013, which is hereby incorporated by reference in its entirety into this application.

BACKGROUND OF THE INVENTION

1. Technical Field

The present invention relates generally to a wireless relay device and a method of processing data using the same and, more particularly, to a data processing method that, when members perform a task in a group, enables the members possessing short-distance wireless portable devices to perform direct communication with a command post at a remote location or with the members of another group via the short-distance wireless portable devices and a long-distance wireless relay device operated within the group.

2. Description of the Related Art

A wireless local area network (WLAN) is a network that is formed in the state in which two or more computers are connected without any wired line. In such a WLAN, devices located within a restricted area may communicate with each other using electromagnetic waves-based orthogonal frequency division multiplex (OFDM) modulation technology. That is, a user may connect to a network while moving across a WLAN support area.

Wi-Fi is a series of technologies that support IEEE 802.11-based WLAN connection and inter-device connection and support the setup of a personal area network (PAN), a local area network (LAN) and a wide area network (WAN).

Wi-Fi is basically applied to communication between an access point (AP) having a function of transferring data to the Internet and terminals providing users with service, such as a laptop and a smart phone.

Recently, WLAN cards are mounted on most IT devices, such as mobile phones, PDAs, desktops, laptop computers and Netbooks in addition to smart phones in order to support an Internet access function using Wi-Fi. In places where the wireless Internet is open to the public, the high-speed Internet may be accessed within a specific range around a location at which a wireless access device is installed.

In the case of a small-sized group organized to perform a specific task, as in the military or the police, generally, in order to perform communication with a leader at a location remote from a corresponding group during the performance of a task, a wireless relay device that supports long-distance communication is operated by a designated operator within the group, and communication between members belonging to the group is performed using wireless portable devices for short-distance communication. That is, communication between the members of the group is performed using the wireless portable devices for short-distance communication carried by the respective members, and communication between the group and the leader is performed using a wireless relay device for long-distance communication that is separately operated.

Korean Patent Application Publication No. 10-2011-0121675 entitled "Communication Bluetooth System" discloses a technology in which a communication means for long-distance communication is not provided to each member belonging to a group, and the long-distance communication of members is collected within the group and performed via a wireless relay device for long-distance communication managed by a separate operator.

SUMMARY OF THE INVENTION

Accordingly, the present invention has been made keeping in mind the above problems occurring in the conventional art, and an object of the present invention is to provide a data processing method that, when members perform a task in a group, enables the members possessing short-distance wireless portable devices to perform direct communication with a command post at a remote location or with the members of another group via the short-distance wireless portable devices and a long-distance wireless relay device operated within the group.

In accordance with an aspect of the present invention, there is provided a data processing method for a wireless relay device, including receiving, by the wireless relay device, a user voice signal; determining whether or not a portable device to receive the user voice signal corresponds to a member of a group if the user voice signal has been received from its own system; if, as a result of the determination, it is determined that the portable device corresponds to the member of the group, encrypting the user voice signal, and outputting the encrypted results using a Wi-Fi module; and, if, as a result of the determination, it is determined that the portable device does not correspond to the member of the group, outputting the user voice signal using a radio transmission and reception unit.

If the user voice signal has been received via the Wi-Fi module, receiving the user voice signal may include checking whether or not the portable device to receive the user voice signal corresponds to another wireless relay device; and, if, as a result of the determination, it is determined that the portable device to receive the user voice signal corresponds to another wireless relay device, outputting the user voice signal using the radio transmission and reception unit.

The data processing method may further include, if, as a result of the determination, it is determined that the portable device to receive the user voice signal does not correspond to another wireless relay device, outputting the user voice signal using the Wi-Fi module.

If the user voice signal has not been received via the Wi-Fi module, receiving the user voice signal may include checking whether or not the portable device to receive the user voice signal corresponds to the wireless relay device; if, as a result of the checking, it is determined that the portable device to receive the user voice signal corresponds to the wireless relay device, decrypting the user voice signal; and outputting the decrypted user voice signal using a voice I/O unit of the wireless relay device.

Checking whether or not the portable device to receive the user voice signal corresponds to the wireless relay device may include, if as a result of the checking, it is determined that the portable device to receive the user voice signal does not correspond to the wireless relay device: determining whether or not the portable device to receive the user voice signal corresponds to a member of a group; if, as a result of the determination, it is determined that the portable device to receive the user voice signal corresponds to the member of the group, outputting the user voice signal using the Wi-Fi module; and if, as a result of the determination, it is determined that the portable device to receive the user voice signal does not correspond to the member of the group, discarding the user voice signal.

In accordance with another aspect of the present invention, there is provided a wireless relay device, including a voice I/O unit configured to receive or output a user voice signal; a voice processing unit configured to perform voice processing on the user voice signal so that the user voice signal corresponds to a wireless channel; an information protection processing unit configured to encrypt or decrypt voice data, corresponding to results processed by the voice processing unit, using an information protection algorithm; a Wi-Fi unit configured to send the encrypted voice data to a portable device of a user located within a set range, or to receive encrypted voice data from a portable device of a user located within the set range; and a radio transmission and reception unit configured to relay wireless communication to a portable device of a user located outside the set range.

The voice processing unit compresses the user voice signal using a voice codec so that the user voice signal corresponds to the wireless channel, or restores compressed voice data.

The wireless relay device may further include a subscriber management unit configured to store and manage a unique identification number of the portable device of the user located within the set range.

The subscriber management unit may register the portable device corresponding to a subscriber before performing communication with the portable device, and may receive a unique identification number of the registered portable device.

The radio transmission and reception unit may receive data from the portable device of the user located outside the set range through the relaying of a wireless relay device of a group to which the portable device of the user located outside the set range belongs, may check a unique identification number of the portable device in the received data, may check whether or not the portable device of the user located outside the set range corresponds to a member of a group using the checked unique identification number, and may determine a transmission path based on results of the checking.

The radio transmission and reception unit may wirelessly send the received data via the Wi-Fi unit if, as a result of the checking, it is determined that a recipient of the received data corresponds to the member of the group, and may discard the received data if, as a result of the checking, it is determined that a recipient of the received data does not correspond to the member of the group.

The wireless relay device may further include a control unit configured to compare a unique identification number of a recipient, corresponding to data input or output via the voice I/O unit, with a unique identification number stored in a subscriber management unit, and to determine whether or not to perform wireless relaying via the Wi-Fi unit or the radio transmission and reception unit based on the results of the comparison.

The information protection processing unit may encrypt a user voice signal directly received via the voice I/O unit, and may decrypt a user voice signal if the recipient of the user voice signal is the wireless relay device.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
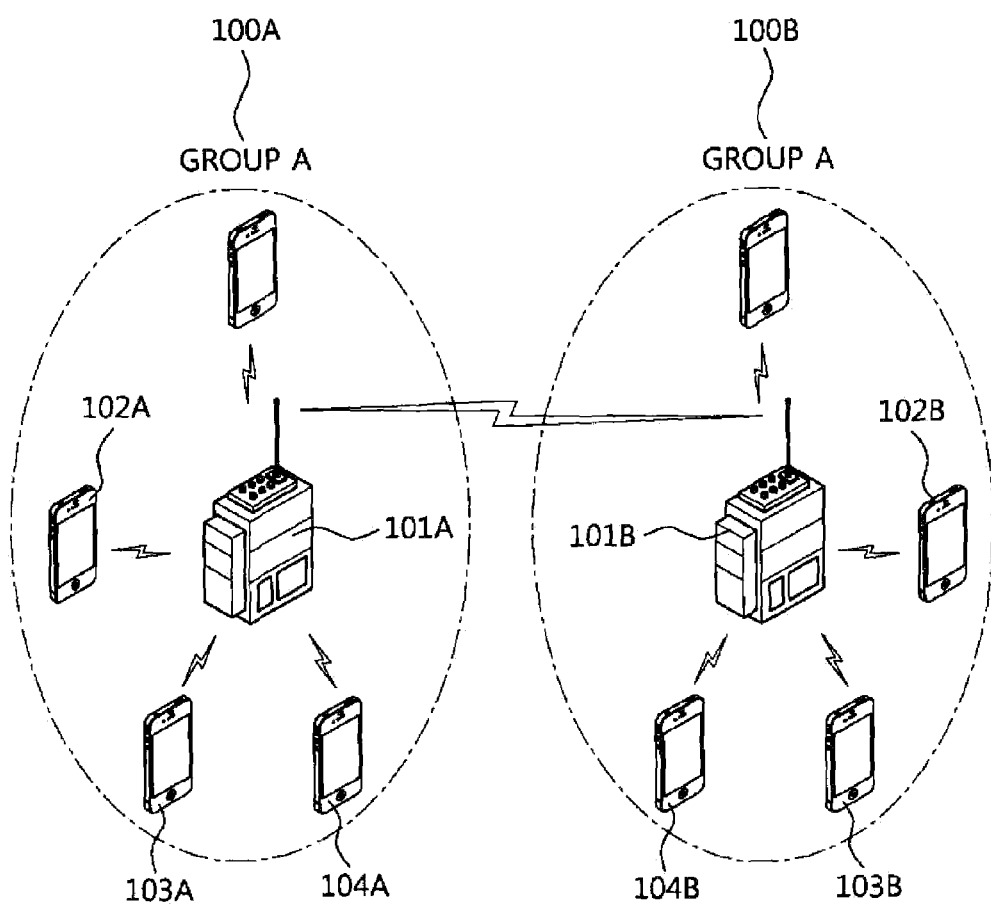
FIG. 1 is a diagram schematically illustrating an environment to which a wireless relay device and a wireless portable device according to an embodiment of the present invention are applied.

The present invention is described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clear.

A data processing method according to an embodiment of the present invention, which, when members perform a task in a group, enables the members possessing short-distance wireless portable devices to perform direct communication with a command post at a remote location or with the members of another group using the short-distance wireless portable devices and a long-distance wireless relay device operated within the group, is described in detail below with reference to the accompanying drawings.

FIG. 1 is a diagram schematically illustrating an environment to which a wireless relay device and a wireless portable device according to an embodiment of the present invention are applied.

Referring to FIG. 1, each of group A 100A and group B 100B operates a wireless relay device 101A or 101B that supports a Wi-Fi communication function within the corresponding group.

The members of group A 100A operate respective portable devices 102A, 103A and 104A that support a Wi-Fi communication function. Furthermore, the members of group B 100B operate respective portable devices 102B, 103B and 104B that support a Wi-Fi communication function.

The portable devices operated in each group connect to the wireless relay device via a Wi-Fi connection upon startup, and enter a state of networking between the members of the group.

That is, the portable devices 102A, 103A and 104A of group A 100A are connected to the first wireless relay device 101A of group A 100A via a Wi-Fi connection, and the portable devices 102B, 103B and 104B of group B 100B are connected to the second wireless relay device 101E of group B 100B via a Wi-Fi connection.

The communication between the members of group A 100A is performed in such a manner that, when a member of group A 100A enters the unique identification number of a counterpart member of the same group into his or her portable device and attempts communication, the first wireless relay device 101A identifies communication within the same group, and thus transmission and reception are performed within the group in relay mode using a Wi-Fi module.

In order for the second member of group A 100A to send data to the portable device 104B of the fourth member of group B 100B using his or her portable device 102A, when the second member of group A 100A enters the unique identification number of the portable device 104B of the fourth member of group B 100B into the portable device 102A and attempts communication, data is transmitted to the wireless relay device 101A of group A 100A via the Wi-Fi connection of the portable device 102A first.

The wireless relay device 101A of group A 100A determines that a recipient is not the portable device of a member of group A 100A based on the received data, and then sends the data using a long-distance wireless transmission function.

The wireless relay device 101B of group B 100B restores the received signal, determines that the recipient of the received signal is the portable device 104B possessed by the fourth member of group B 100B, and sends the received signal to the portable device 104B of the fourth member of group B 100B via the Wi-Fi connection of the wireless relay device 101B.

As described above, in this embodiment of the present invention, the wireless relay device equipped with an AP and the portable devices using the wireless relay device support secure communication protected from illegal access over a transmission channel via an end-to-end scheme between the members of a group using the wireless relay device supporting wireless communication in various frequency bands and the portable devices of the members of the group having a Wi-Fi access function. Furthermore, the present invention provides communication technology that supports secure voice communication with the members of other groups at remote locations because networking is formed between the wireless relay devices at the remote locations.

For example, in the case of a small-sized group organized to perform a specific task, generally, a single radio for medium- and long-distance wireless communication with a remote location, such as a command and control center located a long distance of several tens of km away from the group, and short-distance radios for communication between the members of the small-sized group are separated operated.

The construction of the wireless relay device is described in detail below with reference to FIG. 2.

Figure 2:
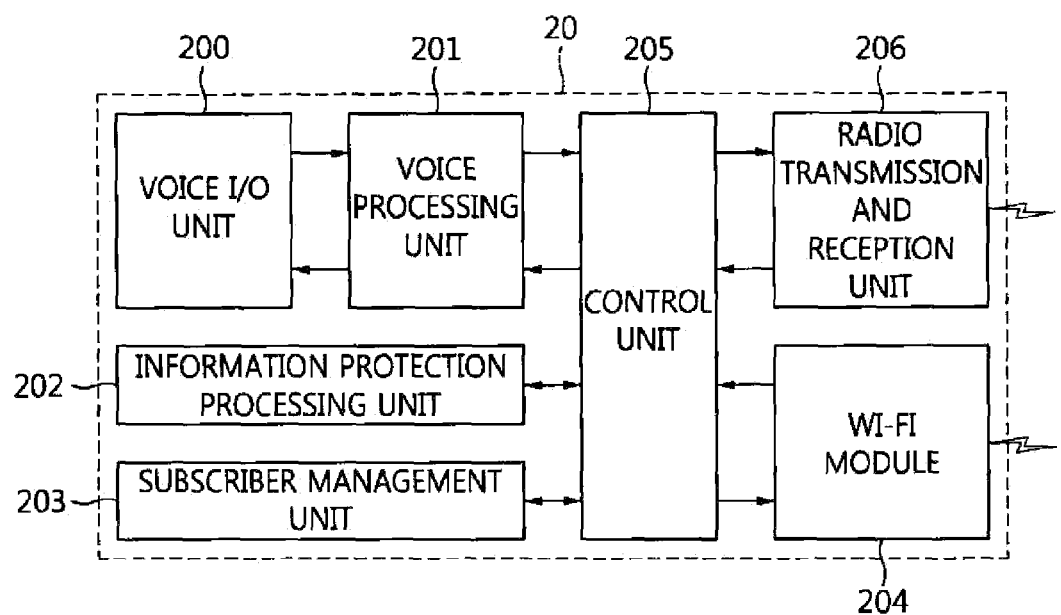
FIG. 2 is a diagram schematically illustrating a wireless relay device according to an embodiment of the present invention.

FIG. 2 is a diagram schematically illustrating a wireless relay device according to an embodiment of the present invention.

Referring to FIG. 2, the wireless relay device 20 includes a voice input/output (I/O) unit 200, a voice processing unit 201, an information protection processing unit 202, a subscriber management unit 203, a Wi-Fi module 204, a radio transmission and reception unit 206, and a control unit 205.

The voice I/O unit 200 receives or outputs user voice signals.

The voice processing unit 201 compresses a voice signal, received by the voice I/O unit 200, using a voice codec so that the voice signal is suitable for transmission over a wireless channel, or restores compressed voice data from a voice signal received by the Wi-Fi module 204 or the radio transmission and reception unit 206 in a reverse manner.

More particularly, the voice processing unit 201 compresses a voice signal in a pulse code modulation (PCM) form using the encoder of a voice codec, or restores a compressed voice signal into a voice signal in PCM form using the decoder of the voice codec.

The information protection processing unit 202 encrypts voice data, corresponding to results compressed by the voice processing unit 201, using an information protection algorithm, or decrypts encrypted voice data using the information protection algorithm. In this case, the information protection processing unit 202 encrypts the voice data before sending the voice data to a specific channel, or decrypts compressed voice data received via a specific channel.

The subscriber management unit 203 stores and manages the unique identification numbers of portable devices possessed by users in a group including the portable devices located within a set range. In this case, the unique identification number of a portable device possessed by a subscriber may be registered with or released from the subscriber management unit 203 using an input device, such as a keypad, a display device and a subscriber registration manual.

Furthermore, the subscriber management unit 203 determines whether or not a recipient, that is, a portable device corresponding to the received data, belongs to a group in association with the control unit 205.

More particularly, the operation method of the subscriber management unit 203 and the control unit 205 may include registering a subscriber with the wireless relay device prior to communication using the wireless relay device and a portable device, entering a unique identification number using the input device of the portable device, adding the unique identification number to the head part of user data output to the Wi-Fi module of the portable device during communication using the push-to-talk (PTT) function of the portable device and sending the user data, receiving, by the wireless relay device, the user data from the portable device, recognizing, by the control unit 205 of the wireless relay device, the unique identification number in the head part of the user data, and checking whether or not the recognized unique identification number is the identifier of the portable device of a group registered with the subscriber management unit 203.

The Wi-Fi module 204 performs short-distance wireless transmission if the portable device of a recipient corresponding to transmission data corresponds to a subscriber in transmission mode, or performs short-distance wireless transmission if the portable device of a recipient corresponds to a short-distance subscriber in reception mode.

The radio transmission and reception unit 206 relays wireless communication with another wireless relay device at a remote location if a recipient is not a short-distance subscriber.

More particularly, the radio transmission and reception unit 206 may perform long-distance wireless transmission if the portable device of a recipient corresponding to transmission data is a subscriber at a remote location in transmission mode, or may receive received data received from a remote location in reception mode.

The control unit 205 controls the components of the wireless relay device 20.

The wireless relay device 20 operates when the wireless relay device 20 receives data, as follows.

The radio transmission and reception unit 206 receives data. The control unit 205 checks the unique identification number of a portable device possessed by a recipient in the received data. The subscriber management unit 203 determines whether or not the portable device corresponds to a member of a group based on the unique identification number. If, as a result of the determination, it is determined that the portable device does not correspond to a member of the group, the subscriber management unit 203 discards the received data. If, as a result of the determination, it is determined that the portable device corresponds to a member of the group, the subscriber management unit 203 wirelessly sends the received data via the Wi-Fi module 204. Furthermore, if the recipient is the wireless relay device itself, the information protection processing unit 202 decrypts the received data, and the voice processing unit 201 outputs decrypted results via the voice I/O unit 200.

The operation of the wireless relay device 20 when the wireless relay device 20 receives a user voice signal and sends the received user voice signal is performed, as follows.

The voice I/O unit 200 receives a user voice signal. The voice processing unit 201 compresses the user voice signal received by the voice I/O unit 200 so that the user voice signal is suitable for transmission over a wireless channel. Thereafter, the control unit 205 determines whether or not the unique identification number of a portable device possessed by the recipient of the user voice signal is the unique identification number of a member of a group registered with the subscriber management unit 203.

If, as a result of the determination, it is determined that the recipient corresponds to a member of the group, the control unit 205 transfers the user voice signal to the Wi-Fi module 204.

If, as a result of the determination, it is determined that the recipient does not correspond to a member of the group, the control unit 205 transfers the user voice signal to the radio transmission and reception unit 206.

The construction of the portable device is described in detail below with reference to FIGS. 3 and 4.

Figure 3:
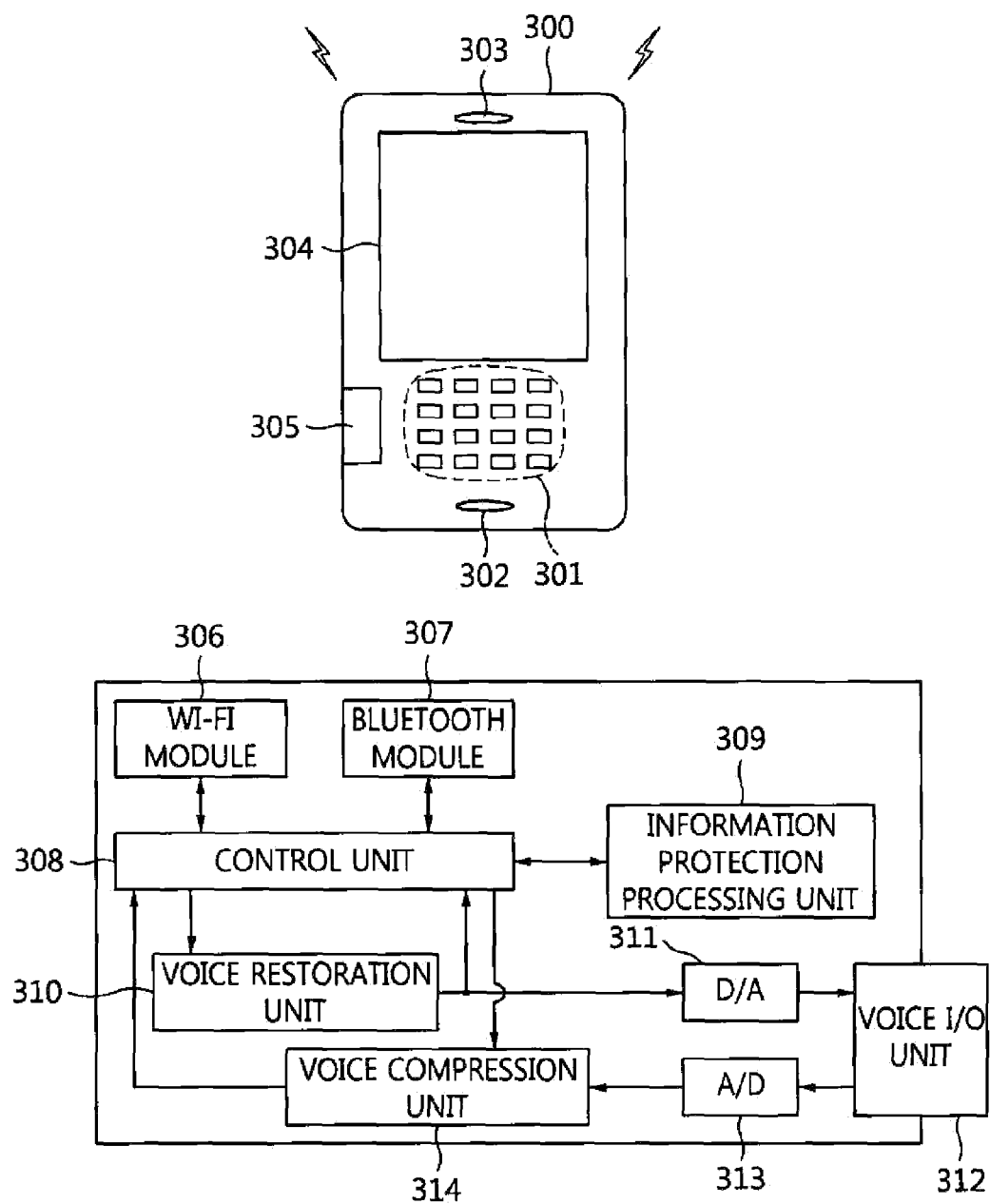
FIG. 3 is a diagram schematically illustrating a portable device according to an embodiment of the present invention.

FIG. 3 is a diagram schematically illustrating a portable device according to an embodiment of the present invention.

Referring to FIG. 3, the portable device includes a main body configured to perform short-distance wireless communication with the wireless relay device, and a headset configured to perform short-distance wireless communication with the main body.

The external user interface of the main body may include a keypad unit 301 configured to be responsible for a user's button input, a voice input unit 302 configured to be responsible for the input of a voice signal, a voice output unit 303 configured to be responsible for the output of a voice signal, a display unit 304 configured to indicate the operating state of the portable device, and a PTT button 305.

The internal components of the main body may include a Wi-Fi module 306, a Bluetooth module 307, a control unit 308, an information protection processing unit 309, a voice restoration unit 310, a digital/analog (D/A) converter 311, a voice I/O unit 312, an analog/digital (A/D) converter 313 and a voice compression unit 314.

The Wi-Fi module 306 supports a function of Wi-Fi communication with the wireless relay device 20.

The Bluetooth module 307 supports a function of communication with the headset 320.

The control unit 308 controls the transfer path of data received from the Wi-Fi module 306 or the Bluetooth module 307, or controls a processing process, such as encryption or decryption, using the information protection processing unit 309.

The information protection processing unit 309 encrypts and decrypts user data.

More particularly, the information protection processing unit 309 restores compressed voice data, received from the Wi-Fi module 306 or the Bluetooth module 307, using an algorithm, or encrypts compressed voice data to be transmitted to the Wi-Fi module 306 using an algorithm.

The voice restoration unit 310 restores compressed voice data, received via the Wi-Fi module 306, to data in PCM form using the decoder of a voice codec.

The D/A converter 311 converts data in PCM form into an analog voice signal.

The voice I/O unit 312 outputs an analog voice signal to the outside of the portable device, or receives an analog voice signal from the outside of the portable device.

The A/D converter 313 converts an analog voice signal into data in PCM form.

The voice compression unit 314 compresses data in PCM form using the encoder of the voice codec in order to reduce a bandwidth before sending the data in PCM form to the Wi-Fi module 306.

Figure 4:
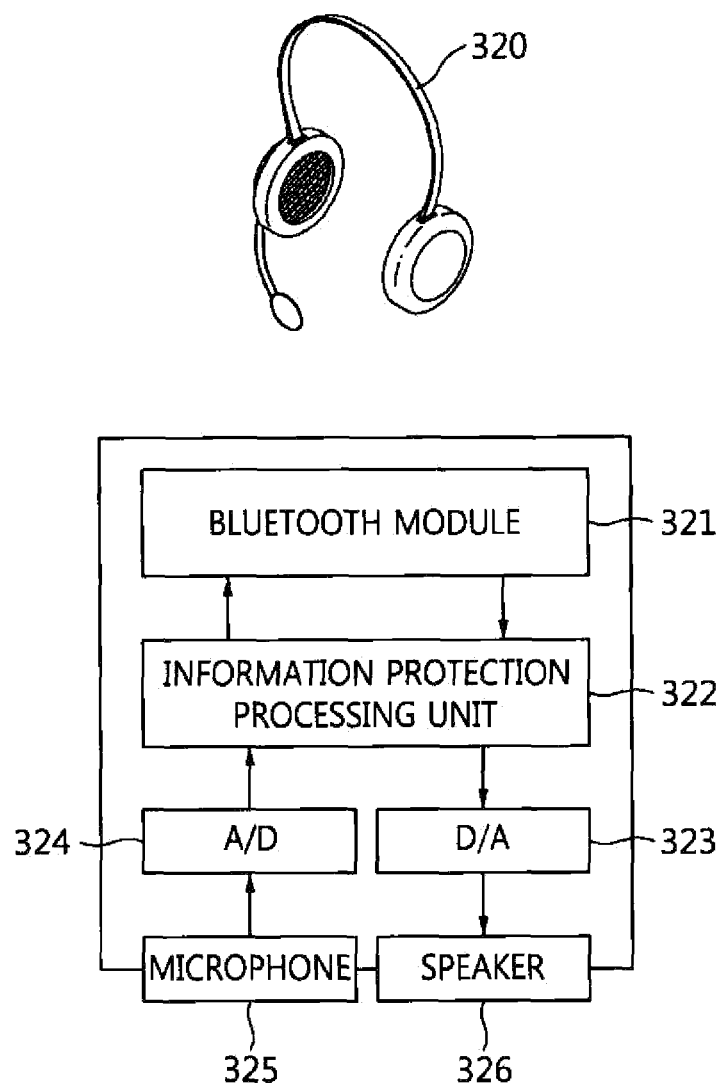
FIG. 4 is a diagram schematically illustrating an additional component of the portable device according to an embodiment of the present invention.

FIG. 4 is a diagram schematically illustrating an additional component of the portable device according to an embodiment of the present invention.

Referring to FIG. 4, the additional component of the portable device 300 may be a headset 320. The headset 320 includes a Bluetooth module 321, an information protection processing unit 322, a D/A converter 323, an A/D converter 324, a microphone 325, and a speaker 326.

The Bluetooth module 321 supports Bluetooth communication with the main body, and receives data in PCM form from the main body.

The information protection processing unit 322 decrypts data in PCM form, received from the Bluetooth module 321, using an information protection algorithm, or encrypts data in PCM form before outputting the data in PCM form to the Bluetooth module 321.

The D/A converter 323 converts data in PCM form into an analog voice signal.

The A/D converter 324 converts a voice signal received from a user into data in PCM form.

The microphone 325 receives a voice signal from a user.

The speaker 326 outputs an analog voice signal.

If a user who uses the portable device 300 and the headset 320 inputs a user voice, the user enters the unique identification number of a subscriber on the recipient side into the portable device 300 using the keypad 301 and the display window 304. Thereafter, when the user starts communication using the headset 320, the user presses the PTT button 305 of the portable device 300, and inputs his or her voice. In this case, the voice input by the user, that is, a voice signal, is converted into data in PCM form via the A/D converter 324 and is then encrypted by the information protection processing unit 322. The data in PCM form encrypted by the information protection processing unit 322 is wirelessly output via the Bluetooth module 321 and then received via the Bluetooth module 307 of the portable device 300.

The information protection processing unit 309 of the main body decrypts the data received via the Bluetooth module 307. The decrypted data is compressed by the voice compression unit 314 and then wirelessly transmitted via the Wi-Fi module 306.

Meanwhile, if a user inputs his or her user voice to the portable device 300 without using the headset 320, the voice I/O unit 312 receives the user voice signal. Thereafter, the A/D converter 313 converts the user voice signal into data in PCM form, and the voice compression unit 314 compresses the data in PCM form. The information protection processing unit 309 encrypts the data compressed by the voice compression unit 314, and the encrypted data is wirelessly transmitted via the Wi-Fi module 306.

When the signal is input to the Wi-Fi module 306 if a signal is received using the headset 320, the voice restoration unit 310 restores the received signal to data in PCM form.

The information protection processing unit 309 decrypts the restored results, and encrypts the decrypted results again. The encrypted results are transmitted to the headset 320 via the Bluetooth module 307.

The information protection processing unit 322 of the headset 320 decrypts the signal received via the Bluetooth module 321. The decrypted results, that is, data in PCM form, is converted into an analog voice signal via the D/A converter 323 and then output via the speaker 326.

As described above, according to an embodiment of the present invention, the wireless relay device configured to include the Wi-Fi module and the personal portable device configured to have a Wi-Fi terminal function and a user data voice transmission function are provided in a single group, and the wireless relay device forms networking with the portable devices of members of the group through the medium of the Wi-Fi module within the group. Accordingly, an effective end-to-end communication protection means can be provided. Furthermore, with regard to the members of another group at a remote location, networking is formed between wireless relay devices and each portable device connects to the Wi-Fi module of the wireless relay device of each group. Accordingly, an effective end-to-end communication protection means can be provided.

The data processing method of the wireless relay device is described in detail below with reference to FIGS. 5 and 6.

Figure 5:
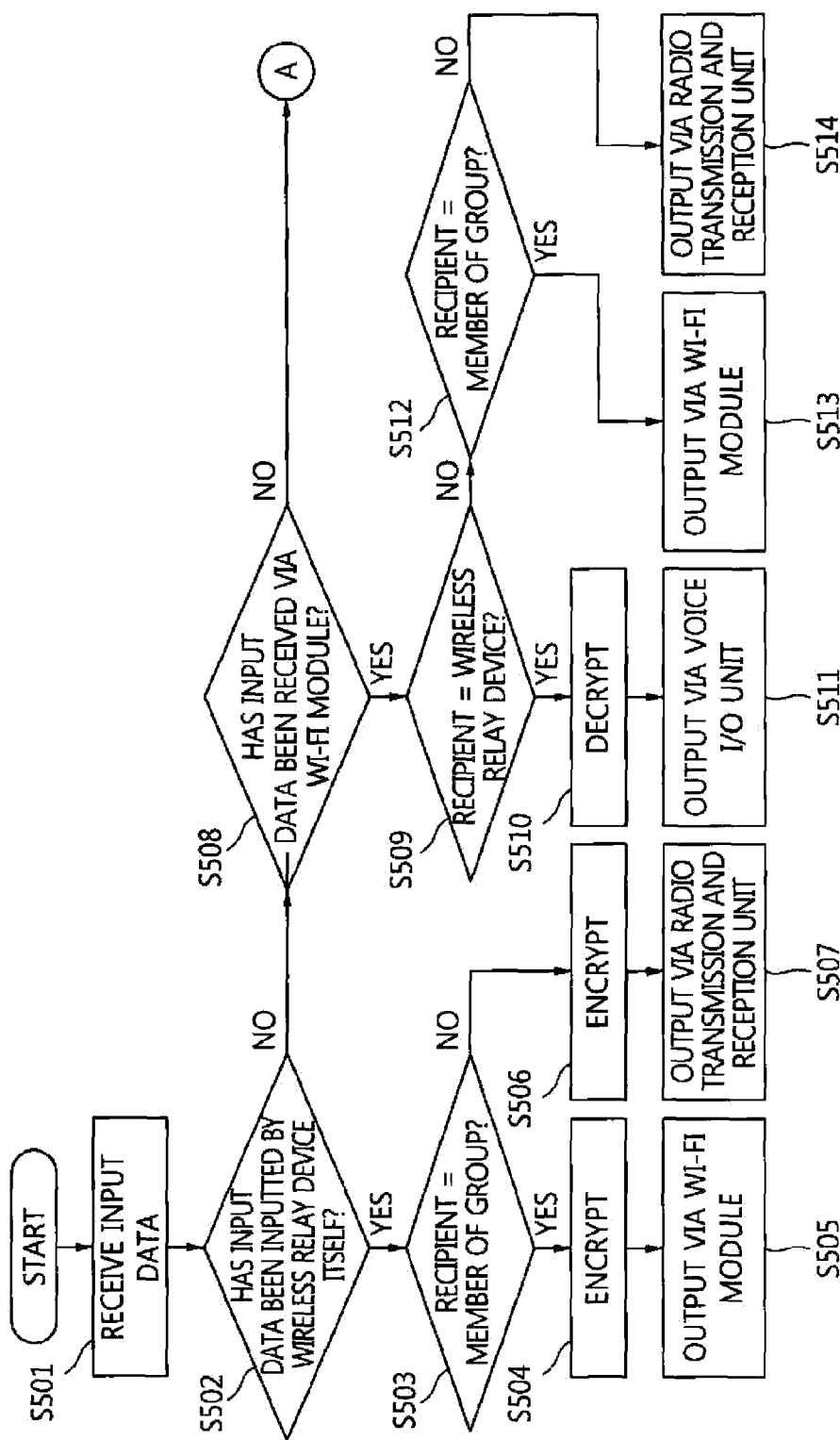
FIGS. 5 and 6 are flowcharts illustrating a method of processing data in a wireless relay device according to an embodiment of the present invention.
Figure 6:
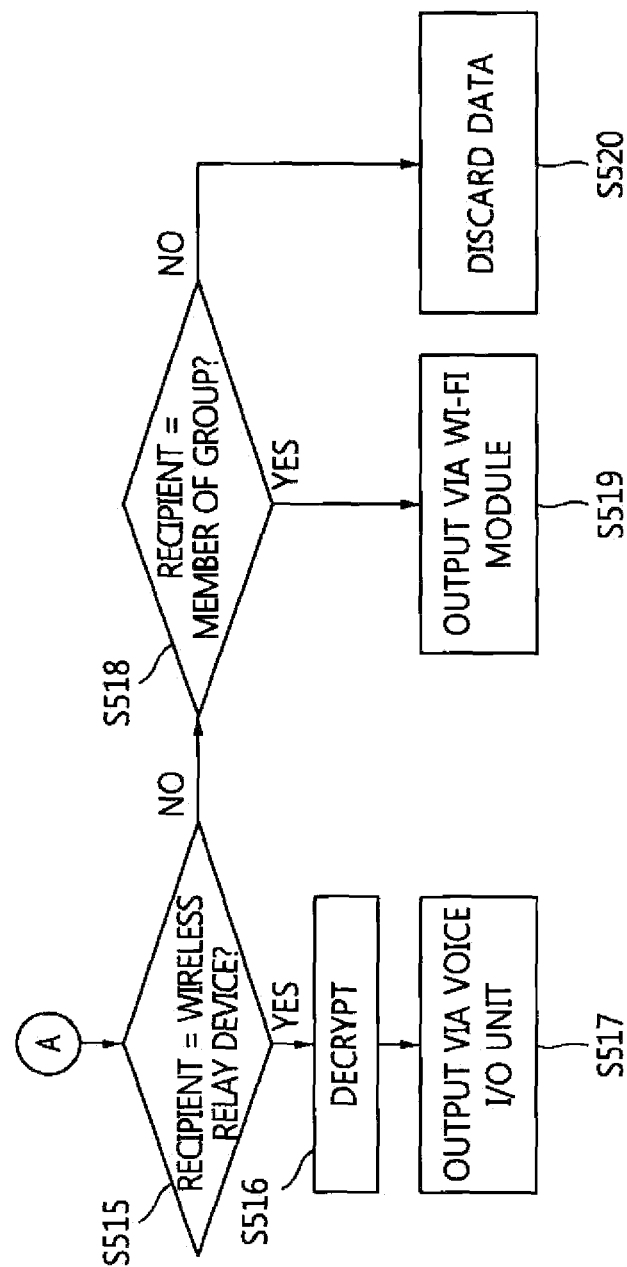

FIGS. 5 and 6 are flowcharts illustrating a method of processing data in the wireless relay device according to an embodiment of the present invention.

Referring to FIG. 5, the wireless relay device 20 receives input data, such as a voice signal, from a user at step S501.

The wireless relay device 20 checks a path along which the input data has been received at step S501, for example, whether or not the input data has been received from its own system (the wireless relay device itself) at step S502. In this case, the wireless relay device 20 checks whether or not the user voice signal has been received via the voice I/O unit 200.

If, as a result of the checking, it is determined that the input data has been received via the voice I/O unit 200, the wireless relay device 20 determines whether or not the portable device of a recipient corresponding to the input data corresponds to a member of a group at step S503.

If, as a result of the determination, it is determined that the portable device of the recipient corresponds to a member of the group, the wireless relay device 20 encrypts voice data using the information protection algorithm at step S504. In this case, the voice data corresponds to results compressed using the voice codec so that the input data, that is, the user voice signal, is suitable for transmission over a wireless channel.

The wireless relay device 20 sends the encrypted results via the Wi-Fi module 204 in a short-distance wireless transmission manner at step S505.

If, as a result of the determination, it is determined that the portable device of the recipient is not a member of the group, the wireless relay device 20 encrypts compressed voice data using the information protection algorithm at step S506, and outputs the encrypted results to another wireless relay device at a remote location via the radio transmission and reception unit 206 at step S507.

If, as a result of the checking at step S502, it is determined the input data has not been received from its own system, the wireless relay device 20 checks whether or not the input data has been received via the Wi-Fi module 204 at step S508.

If, as a result of the checking at step S508, it is determined that the input data has been received via the Wi-Fi module 204, the wireless relay device 20 determines whether or not a recipient corresponding to the input data is the wireless relay device at step S509.

If, as a result of the determination at step S509, it is determined that the recipient corresponding to the input data is the wireless relay device, the wireless relay device 20 decrypts the input data, that is, encrypted voice data, using the information protection algorithm at step S510.

The wireless relay device 20 outputs the encrypted results via the voice I/O unit 200 at step S511.

If, as a result of the determination at step S509, it is determined that the recipient corresponding to the input data is not the wireless relay device, the wireless relay device 20 determines whether or not the portable device of the recipient corresponds to a member of a group at step S512.

If, as a result of the determination at step S512, it is determined that the portable device of the recipient corresponds to a member of the group, the wireless relay device 20 sends the voice data via the Wi-Fi module 204 in a short-distance wireless transmission manner at step S513.

If, as a result of the determination at step S512, it is determined that the portable device of the recipient is not a member of the group, the wireless relay device 20 outputs the voice data to another wireless relay device at a remote location via the radio transmission and reception unit 206 at step S514.

Referring to FIG. 6, if, as a result of the checking at step S508, it is determined that the input data has not been received via the Wi-Fi module 204 (the input data is received from the portable device of a user located outside the set range), the wireless relay device 20 determines whether or, not a recipient corresponding to the input data is the wireless relay device at step S515.

If, as a result of the determination at step S515, it is determined that the recipient corresponding to the input data is the wireless relay device, the wireless relay device 20 decrypts the input data, that is, encrypted voice data, using the information protection algorithm at step S516.

The wireless relay device 20 outputs the encrypted results via the voice I/O unit 200 at step S517.

If, as a result of the determination at step S515, it is determined that the recipient corresponding to the input data is not the wireless relay device, the wireless relay device 20 determines whether or not the portable device of the recipient corresponds to a member of a group at step S518.

If, as a result of the determination at step S518, it is determined that the portable device of the recipient corresponds to a member of the group, the wireless relay device 20 sends the voice data via the Wi-Fi module 204 in a short-distance wireless transmission manner at step S519.

If, as a result of the determination at step S518, it is determined that the portable device of the recipient is not a member of the group, the wireless relay device 20 discards the voice data at step S520.

As described above, according to the present invention, the wireless relay device configured to include the Wi-Fi module and the personal portable device configured to have a Wi-H terminal function and a user data voice transmission function are provided in a single group, and the wireless relay device forms networking with the portable devices of the members of the group through the medium of the Wi-Fi module within the group. Accordingly, an effective end-to-end communication protection means can be provided. Furthermore, with regard to the members of another group at a remote location, networking is formed between wireless relay devices and each portable device connects to the Wi-Fi module of the wireless relay device of each group. Accordingly, an effective end-to-end communication protection means can be provided.

The data processing method of the wireless relay device according to an embodiment of the present invention is advantageous in that it can provide an efficient communication means between members at remote locations in addition to between members at adjacent locations.

Furthermore, the present invention can provide a secure communication function between the portable devices because the information protection function is installed in the portable device, and also enable secure data transmission in a radio section between a wireless headset and the portable device using the information protection function installed in the wireless headset even when the wireless headset is used.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A data processing method for a wireless relay device, comprising:
   receiving, by the wireless relay device a user voice signal;
   if the user voice signal has been received from the wireless relay device, determining, whether or not a portable device to receive the user voice signal corresponds to a member of a group of portable devices which communicate with each other within a short communication range through the wireless relay device;
   if, as a result of the determination, it is determined that the portable device corresponds to the member of the group, encrypting the user voice signal, and outputting the encrypted results using a Wi-Fi module; and
   if, as a result of the determination, it is determined that the portable device does not correspond to the member of the group but corresponds to a member of another group of portable devices which communicate with each other within a short communication range through another wireless relay device, outputting the user voice signal using a radio transmission and reception unit to the other wireless relay device,
   wherein the receiving of the user voice signal comprises, if the user voice signal has been received via the Wi-Fi module:
   checking whether or not the portable device to receive the user voice signal corresponds to another wireless relay device; and
   if, as a result of the determination, it is determined that the portable device to receive the user voice signal corresponds to another wireless relay device, outputting the user voice signal using the radio transmission and reception unit to the other wireless relay device.

2. The data processing method of claim 1, further comprising, if, as a result of the determination, it is determined that the portable device to receive the user voice signal does not correspond to the other wireless relay device, outputting the user voice signal using the Wi-Fi module.

3. The data processing method of claim 1, wherein receiving the user voice signal comprises, if the user voice signal has not been received via the Wi-Fi module:
   checking whether or not the portable device to receive the user voice signal corresponds to the wireless relay device;
   if, as a result of the checking, it is determined that the portable device to receive the user voice signal corresponds to the wireless relay device, decrypting the user voice signal; and
   outputting the decrypted user voice signal using a voice I/O unit of the wireless relay device.

4. The data processing method of claim 3, wherein checking whether or not the portable device to receive the user voice signal corresponds to the wireless relay device comprises, if, as a result of the checking, it is determined that the portable device to receive the user voice signal does not correspond to the wireless relay device:
   determining whether or not the portable device to receive the user voice signal corresponds to a member of a group;
   if, as a result of the determination, it is determined that the portable device to receive the user voice signal corresponds to the member of the group, outputting the user voice signal using the Wi-Fi module; and
   if, as a result of the determination, it is determined that the portable device to receive the user voice signal does not correspond to the member of the group, discarding the user voice signal.

5. A wireless relay device, comprising:
   a voice I/O unit configured to receive or output a user voice signal;
   a voice processing unit configured to perform voice processing on the user voice signal so that the user voice signal corresponds to a wireless channel;
   an information protection processing unit configured to encrypt or decrypt voice data, corresponding to results processed by the voice processing unit, using an information protection algorithm;
   a Wi-Fi unit configured to send the encrypted voice data to a member of a group of portable devices which communicate with each other within a short communication range through the wireless relay device, or to receive encrypted voice data from a member of a group of portable devices which communicate with each other within a short communication range through the wireless relay device;
   a radio transmission and reception unit configured to relay wireless communication to a member of another group of portable devices which communicate with each other within a short communication range through another wireless relay device;
   a subscriber management unit configured to store and manage a unique identification number of each of the portable devices which communicate with each other within a short communication range through the wireless relay device; and
   a control unit configured to compare a unique identification number of a recipient, corresponding to data input or output via the voice I/O unit, with a unique identification number stored in the subscriber management unit, and to determine whether to perform wireless relaying via the Wi-Fi unit or via the radio transmission and reception unit based on results of the comparison.

6. The wireless relay device of claim 5, wherein the voice processing unit compresses the user voice signal using a voice codec so that the user voice signal corresponds to the wireless channel, or restores compressed voice data.

7. The wireless relay device of claim 5, wherein the subscriber management unit registers the portable device corresponding to a subscriber before performing communication with the portable device, and receives a unique identification number of the registered portable device.

8. The wireless relay device of claim 5, wherein the radio transmission and reception unit receives data from the member of the other group of portable devices through relaying of a wireless relay device of the other group of portable devices, checks a unique identification number of the portable device in the received data, checks whether or not the member of the other group of portable devices corresponds to a member of a group using the checked unique identification number, and determines a transmission path based on results of the checking.

9. The wireless relay device of claim 8, wherein the radio transmission and reception unit wirelessly sends the received data via the Wi-Fi unit if, as a result of the checking, it is determined that a recipient of the received data corresponds to the member of the group, and discards the received data if, as a result of the checking, it is determined that a recipient of the received data does not correspond to the member of the group.

10. The wireless relay device of claim 5, wherein the information protection processing unit encrypts a user voice signal directly received via the voice I/O unit, and decrypts a user voice signal if a recipient of the user voice signal is the wireless relay device.

* * * * *